Figure 1:
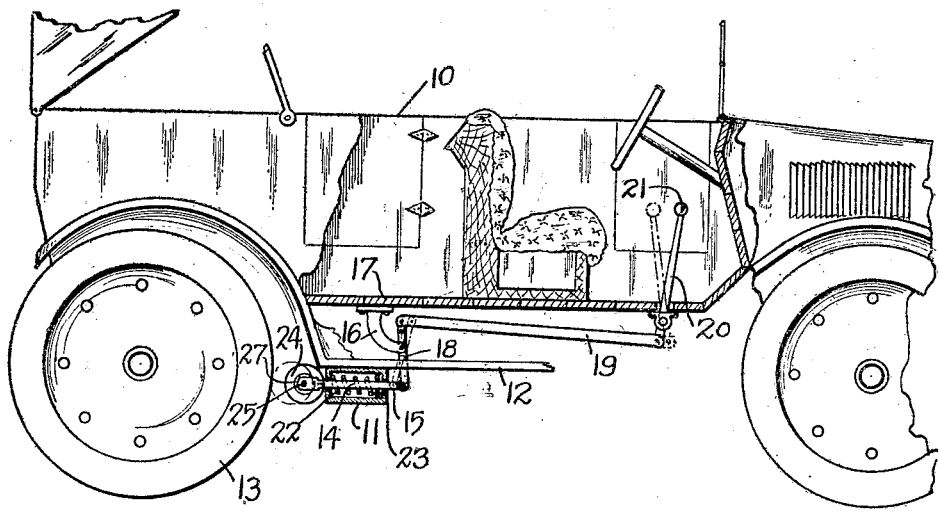

May 13, 1924.

M. GREENBERG 1,494,108

AUXILIARY BRAKE FOR AUTOMOBILES

Filed Jan. 25, 1923

Inventor
Morris Greenberg
By his Attorney

Patented May 13, 1924.

1,494,108

UNITED STATES PATENT OFFICE.

MORRIS GREENBERG, OF NEW YORK, N. Y.

AUXILIARY BRAKE FOR AUTOMOBILES.

Application filed January 25, 1923. Serial No. 614,738.

*To all whom it may concern:*

Be it known that I, MORRIS GREENBERG, a citizen of the United States of America, residing at New York city, Bronx County, State of New York, have invented certain new and useful Improvements in Auxiliary Brakes for Automobiles, of which the following is a specification.

This invention relates to skid prevention devices and in particular to one which is adapted for use on automotive vehicles.

A particular object of the invention is to eliminate skidding of the car on wet pavements and in order to do this without causing unnecessary wear on the tires due to suddenly applying the brakes to lock the rear wheels, I use a device which will throw a sufficient pressure against the tires to rapidly decrease the momentum of the car and bring it to a speed where the application of the brakes will not cause skidding.

Another object of the invention is the application of my device to both rear wheels simultaneously so that skidding is eliminated, it being well known that one cause of skidding is the locking of one wheel and not the other, the brake lining being more or less oily and non-gripping on one wheel will not lock that wheel with the result that the car will tend to pivot on the opposite or locked wheel.

Figure 2:
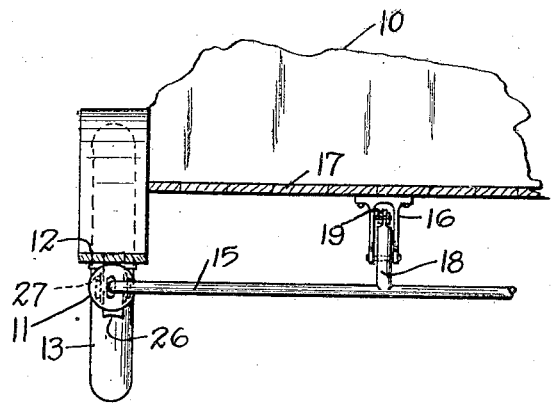

Referring to the drawing wherein one embodiment of my invention is illustrated;

Fig. 1 is a side elevation of a motor car shown partly in section to disclose the application of my improved anti-skid device thereto; and Fig. 2 is a sectional elevation showing the transverse operating bar and its relation to the anti-skid devices.

Referring to the drawing in detail, 10 denotes a motor car of the passenger type, although it is to understood that my device may be applied to business vehicles, trucks and the like as well as to passenger cars. A hollow supporting member 11 is positioned under the running board 12 on each side of the car adjacent the rear wheels 13 and therethrough pass the rearwardly extending pivoted ends 14 of a transverse operating bar 15 which is pivoted centrally of the car on a bracket 16 which is suitably secured to the underside of the car floor 17. The bar 15 at the end of its vertical portion 18 is pivotally engaged by the rear end of a longitudinally extending link 19 which at its forward end is pivotally connected with the lower end of the operating lever 20 which projects up through the floor of the car in which it is pivoted at a point adjacent the driver's seat, so that the upper end or handle 21 thereof is within reach of the driver.

Within the supporting members 11 there are disposed springs 22 which are wound about the roller-operating bars 15 and act against the washers 23 which are secured to the members 14. The springs which are normally under compression tend to keep the rollers 24 away from the wheels 13 and the operating lever in its forward position, as indicated in full lines in Fig. 1.

The rear ends of the members 14 are bifurcated to receive the rollers 24 which are pivoted therein through the medium of the pins 25. The rollers may have their faces contoured as at 26 to match the tire face, and they are of solid rubber with a suitable metal wear resisting hub 27.

When the car is to be slowed down on slippery pavement, the operating lever 20 is drawn rearwardly against the action of the springs 22 to thrust the rollers 24 against the rear wheels 13 with great force, and simultaneously against each wheel, so that there will be a simultaneous slowing down of the rear wheels. When the momentum of the car has been cut down by the pressure of the rollers against the wheels, the brakes may be applied to slowly lock the wheels.

It is understood that my invention is susceptible of various modifications and I do not wish to be limited to the precise arrangement of the operating levers as shown and described.

What I claim is:—

An anti-skid device for wheeled vehicles comprising a resilient roller member adapted to engage the wheel of the vehicle, a rod on the end of which said roller is mounted, a housing through which said rod passes, a spring in said housing, a flanged portion on said rod with which said spring is adapted to contact to maintain the roller normally away from the wheel, and means associated with said rod for moving the roller against the wheel against the resistance of said spring.

MORRIS GREENBERG.